(No Model.) E. B. COXE & S. SALMON. 2 Sheets—Sheet 1.
MECHANICAL MOVEMENT.
No. 419,035. Patented Jan. 7, 1890.

Witnesses
Chas. J. Williamson.
Henry C. Hazard.

Inventors
E. B. Coxe and S. Salmon, by
Crindle and Russell, their Attys (No Model.) 2 Sheets—Sheet 2.

E. B. COXE & S. SALMON.
MECHANICAL MOVEMENT.

No. 419,035. Patented Jan. 7, 1890

UNITED STATES PATENT OFFICE.

ECKLEY B. COXE AND SAMUEL SALMON, OF DRIFTON, PENNSYLVANIA; SAID SALMON ASSIGNOR TO SAID COXE.

MECHANICAL MOVEMENT.

SPECIFICATION forming part of Letters Patent No. 419,035, dated January 7, 1890.

Application filed May 11, 1889. Serial No. 310,432. (No model.)

*To all whom it may concern:*

Be it known that we, ECKLEY B. COXE and SAMUEL SALMON, of Drifton, in the county of Luzerne, and in the State of Pennsylvania, have invented certain new and useful Improvements in Mechanical Movements; and we do hereby declare that the following is a full, clear, and exact description thereof, reference being had to the accompanying drawings, in which—

Figure 1:
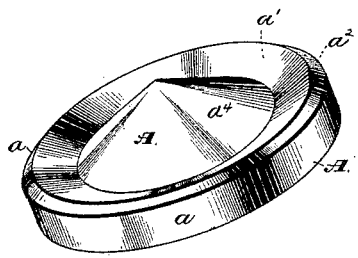
Figure 2:
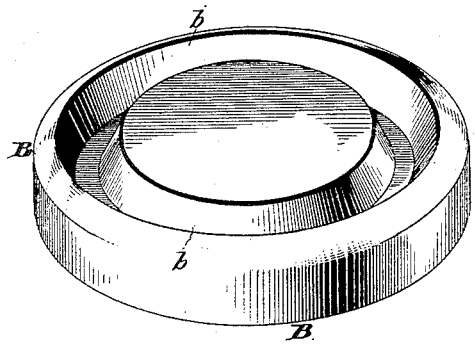
Figure 3:
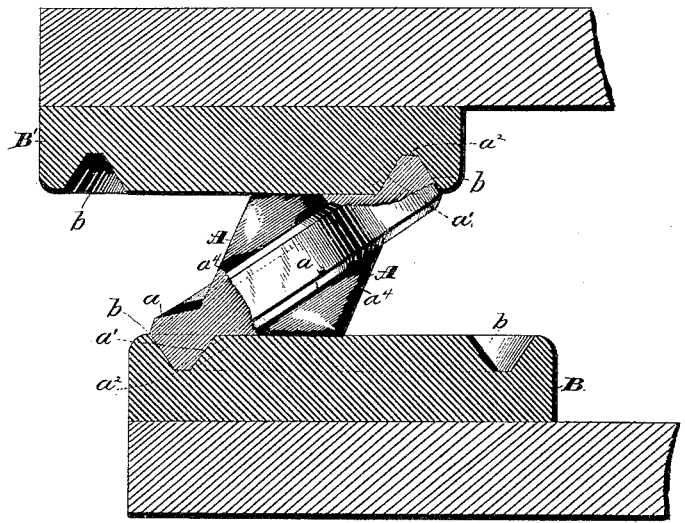
Figure 4:
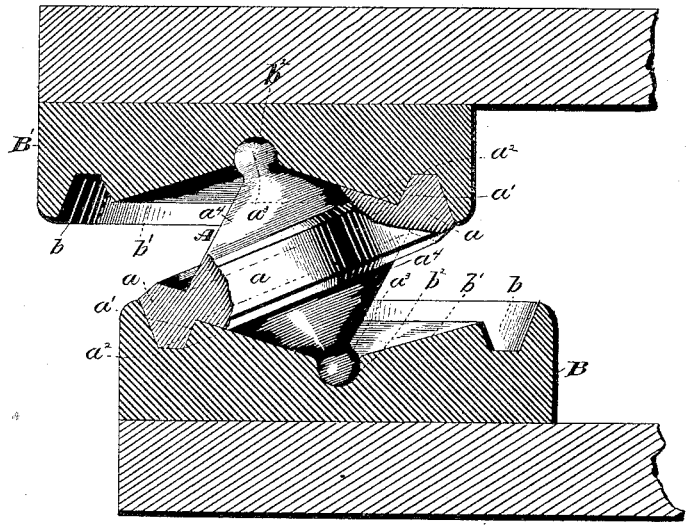

Figure 1 is a perspective view of our roller separated from its bearings. Fig. 2 is a like view of one of said bearings. Fig. 3 is a side elevation, partly in section, of said parts when combined; and Fig. 4 is a like view of the same, showing modifications in the form of the ends of the rollers and in the corresponding positions of the bearings.

Letters of like name and kind refer to like parts in each of the figures.

Our invention relates to an improved mechanical motion for which Letters Patent No. 369,233 were issued upon the 11th day of August, 1887, and has for its object an improvement in the rolling-supports for the part to be gyrated; to which end said invention consists in the relative forms of the rollers and their bearings, substantially as and for the purpose hereinafter specified.

In the use of double-cone rollers A and A as a support for a part to be gyrated where a high velocity is given there is a tendency upon part of each roller to leave its lower or supporting-bearing B, and a like tendency for the upper bearing B′, with the load carried thereby, to be thrown from off said roller in consequence of centrifugal force.

In order to insure the engagement of the roller A and its bearings B and B′ and render any desired speed practicable, we provide said roller with a centrally-located circumferential enlargement $a$, which upon each of its upper and lower sides has a V shape in cross-section, so as to form of the same a bearing-face that has oppositely-inclined faces $a'$ and $a^2$, with the outer face $a^2$ in substantially the same plane as the face of the body of said roller upon the same end.

The bearings B and B′ are circular in form, and within the face of each is provided an annular groove $b$, that corresponds in cross-section to the size and shape in cross-section of one side and the periphery of the enlargement $a$, which groove receives such enlargement and furnishes tracks for its periphery and for two of its faces $a'$ and $a^2$, while the main face $a^4$ of the same end of said roller finds a track upon the face of said bearing. As thus constructed, the enlargement of the roller A, engaging with the sides of the groove $b$ of the bearing B, effectually locks said parts in relative radial position and prevents accidental displacement. If desired, the strain upon said enlargement may be lessened by making the main face $b'$ of said bearing conical, and, as a further precaution, the center of said face may be provided with a spherical recess $b^2$, and upon the end of said roller may be formed a correspondingly-shaped boss $a^3$.

Having thus described our invention, what we claim is—

As an improvement in means for producing gyratory motion in a horizontal plane, a double-cone roller which is provided at the outer edge of each face with supplemental projecting V-shaped faces, in combination with a circular bearing that has its surface conformed to and adapted to furnish a track for said roller, substantially as and for the purpose specified.

In testimony that we claim the foregoing we have hereunto set our hands this 7th day of May, 1889.

ECKLEY B. COXE.
SAMUEL SALMON.

Witnesses:
HARRY J. DAVIS,
ELLIOTT A. OBERRENDER.